United States Patent [19]

Green

[11] 4,268,428

[45] May 19, 1981

[54] ASPHALTIC MATERIAL AND METHOD

[76] Inventor: Robert R. Green, 3306 NW. Oakcrest Dr., Kansas City, Mo. 64151

[21] Appl. No.: 56,865

[22] Filed: Jul. 12, 1979

[51] Int. Cl.$^3$ .............................................. C08L 91/00
[52] U.S. Cl. ............................ 260/28.5 AS; 427/138; 427/140; 427/393.6
[58] Field of Search ................ 260/28.5 AS; 427/138, 427/140, 385 C

[56] References Cited

U.S. PATENT DOCUMENTS

| | | | |
|---|---|---|---|
| 3,979,916 | 9/1976 | Califano et al. | 260/28.5 AS |
| 4,036,799 | 7/1977 | Westermann | 260/28.5 AS |
| 4,041,712 | 8/1977 | Stepien, Jr. et al. | 260/28.5 AS |
| 4,073,759 | 2/1978 | Lowry et al. | 260/28.5 AS |

OTHER PUBLICATIONS

Amsco-Res 3011, Union Oil Co. of California.
Amsco-Res 3077, Union Oil Co. of California.
Comparison Chart of the Neoprene Latexes (1976), E. I. DuPont de Nemours and Co.
Neoprene Latexes-Their Preparation and Characteristics, pp. 1-7, E. I. DuPont de Nemours and Co.

*Primary Examiner*—Melvyn I. Marquis

[57] ABSTRACT

An improved asphaltic material useful for sealing or patching of porous, interstitial substrates such as concrete or asphalt is provided which achieves superior results by flowing into and at least partially filling the substrate interstices themselves, as opposed to serving merely as a surface coating. The material preferably includes a conventional CRS-1H cationic asphaltic emulsion, respective quantities of a vinyl acrylic copolymer and a Neoprene latex. In one type of sealing application, a diluted quantity of the asphaltic material is heated to about 160° F. and is flooded over the substrate to be sealed; the liquid passes into and fills the substrate voids, and, after hardening of the material, an effective, gasket-like seal for the substrate is presented which retains its integrity during varying ambient weather conditions and under hard use.

8 Claims, No Drawings

ASPHALTIC MATERIAL AND METHOD

BACKGROUND OF THE INVENTION

1. Field of the Invention

The present invention is concerned with an asphalt-based material including synthetic resin components which render the material especially useful for sealing and/or patching of porous material such as concrete, asphalt or the like. The invention also comprehends a method of sealing such substrates in a manner whereby the interstices of the substrate are filled so as to positively prevent water flow or seepage therethrough.

2. Description of the Prior Art

It is of course well known that paving materials such as concrete or asphalt are porous and subject to water flow therethrough. In effect, the voids or interstices present in such substrates act as passageways for moisture. Numerous attempts have been made in the past to seal paving substrates against the effects of water. To give but one example, owners of multi-level, poured concrete parking facilities have spent many thousands of dollars in attempts to seal their concrete structures against water flow and its attendant disadvantages. Without known exception, the materials used in the past for sealing purposes have been simply coating substances applied directly to the upper surface of the concrete to be sealed.

Prior surface coatings are however prone to develop "pin holes" through which water can pass. When this occurs water begins to flow through the concrete substrate and also can create blisters in the coating itself. Complete failure of the seal coating within a relatively short time is then a virtual certainty.

Another disadvantage of prior known coating materials is their inability to cope with temperature extremes. That is to say, most coating systems are very prone to failure during winter-time freeze-thaw conditions, and this further lessens the effective service life of these materials.

Accordingly, there is a real need in the art for improved materials and methods for sealing and/or repair of concrete or the like, which provides a long-wearing, effective moisture seal or barrier that retains its integrity during widely varying ambient weather conditions.

SUMMARY OF THE INVENTION

The present invention overcomes the problems noted above by provision of an asphalt material containing from about 50 to 95% by weight of aqueous asphaltic emulsion, along with respective quantities of a vinyl acrylic copolymer and a NEOPRENE latex. The latter two components serve to give the asphaltic material a measure of resiliency during use thereof, and further facilitate formation of an effective, gasket-like seal of the interstices of a porous substrate. In preferred forms, the emulsion is present at a level of about 90% by weight, whereas the copolymer and latex together constitute about 10% by weight of the material.

A method of sealing a porous interstitial substrate of concrete or the like also forms a part of the invention, and includes the steps of preparing a mixture comprising water and a vinyl acrylic copolymer (and in many instances a quantity of the asphaltic material), followed by heating the mixture to a temperature above ambient. The heated mixture is then liberally applied to the substrate to be treated so as to allow the mixture to flow into the interstices and at least partially fill certain of the latter. The mixture is then allowed to harden in the interstices for creating a desirable gasket-like seal.

DESCRIPTION OF THE PREFERRED EMBODIMENTS

Broadly speaking, the improved asphalt material of the present invention comprises from about 50 to 95% by weight of an aqueous asphaltic emulsion, along with respective quantities of a vinyl acrylic copolymer and a NEOPRENE latex. The copolymer and latex together constitute from about 5 to 50% by weight of the overall material.

Preferably, the asphaltic emulsion is a conventional CRS-1H cationic emulsion (CRS-1H being an art-recognized designation). Such an emulsion normally includes about 65% by weight asphaltic solids, an aqueous phase, and at least one surfactant. Such emulsions are commercially available from a number of sources, including the Phillips Petroleum Company and Hiway Asphalt Co. of Salina, Kansas.

In the preferred embodiment, the asphaltic emulsion is present at a level of about 90% by weight of the overall material, with the copolymer and latex together constituting about 10% by weight thereof. With respect to the synthetic resin components, the copolymer is preferably present in an amount in excess of the NEOPRENE latex. In the most preferred form wherein the copolymer and latex together constitute about 10% by weight of material, the copolymer is present at a level of about 7% by weight, and the latex is present at a level of about 3% by weight.

The most preferred vinyl acrylic copolymers for use in the invention are sold by the Union Oil Company of California, Amsco Division, under the designation "Amsco-Res 3077" and "Amsco-Res 3011". The first such product is described in a manufacturer's product bulletin (Form No. AR3077-1076), while the other product is described in a similar bulletin (Form No. AR3011876). Both of these bulletins are available from the manufacturer. Briefly however, the Amsco-Res 3077 product is characterized as a vinyl acetate-acrylic copolymer having a solids content of from about 54 to 56% by weight, a pH of 4.5–5.5, viscosity (cps.) of 1500–2500, and a particle size of from about 0.2–0.4 microns. The Amsco-Res 3011 product is likewise a vinyl acetate-acrylic copolymer having a solids content of about 55% by weight, a pH of about 3, a viscosity (cps.) of about 1150 and a particle size of from about 0.2–0.4 microns.

Preferably, the copolymer used in the present invention should be a vinyl acetate-acrylic copolymer having a solids content of from about 50 to 60% by weight. The above described products are exemplary of copolymers usable in the invention, but a variety of other similar copolymers can also be employed.

The NEOPRENE latex component of the present invention is advantageously a carboxylated polymer having a standard solids content of from about 40 to 50% by weight. An exemplary product in this category is a NEOPRENE latex sold by the Du Pont Company, Elastomer Chemicals Department, Wilmington, Delaware under the designation "Neoprene Latex 102." This product is a medium strength carboxylated polymer useful in adhesives, bonded bats, coatings and saturants. The primary monomer used in making this product is chloroprene, the co-monomer is methacrylic acid, and the emulsifier is polyvinyl alcohol. The product has a chlorine content of 36%, a pH of 7.0, and a standard solids content of 46% by weight. Further information regarding this product can be obtained from a bulletin entitled "Comparison Chart of the Neoprene Latexes", No. ADH-210.1. Additionally, general information regarding such products can be found in a bulletin entitled "Neoprene Latexes—Their Preparation and Characteristics", No. ADH-200.1. Both of these bulletins are available from the Du Pont Company and are hereby incorporated by reference into the present specification.

In all cases the NEOPRENE latexes include chloropene as the primary monomer, and in certain cases a comonomer such as 2,3-dichloro-1,3-butadiene, acrylonitrile or sulfur are employed. The standard solids content of the NEOPRENE latex ranges from 40-60%.

In preparative procedures the CRS-1H asphaltic emulsion is first placed in a heating vat equipped with a centrifugal pump recirculation system. The emulsion is heated to a temperature of from about 100°–170° F. (most preferably 160° F.), with continuous recirculation. At this point the copolymer and latex are added to the circulating, heated emulsion, and the entire composition is allowed to thoroughly mix for a sufficient period of time to achieve substantial homogeneity. The completed material is then allowed to cool to ambient and is placed in appropriate containers for shipping or use.

Two general methods have been developed for using the material of the present invention to seal porous, interstitial substrates such as concrete or asphalt or the like. Broadly speaking, the method includes the steps of preparing a mixture including water and a vinyl acrylic copolymer, heating the mixture to a temperature above ambient, and applying the heated mixture to the substrate. The mixture can thereby flow into the interstices of the substrate and at least partially fill certain of the latter. Upon hardening, the mixture presents an effective, gasket-like seal in the interstitial passageways presented by the substrate. The initial mixture may or may not include an asphaltic emulsion. In those cases where it does not, the asphaltic material is applied as a secondary coating along with aggregate to complete the seal.

More particularly, the most preferred mixture includes about 50% by weight water, and about 50% by weight of the asphaltic material. As noted, the asphaltic material would include from about 50 to 95% by weight of an asphalt emulsion such as the CRS-1H product, and respective quantities of a vinyl acrylic copolymer and a NEOPHENE latex, the latter two components together totalling from about 5 to 50% by weight of the asphaltic material. The preferred mixture is prepared simply by diluting the asphaltic material with water, followed by heating to a temperature from about 100°–170° F. (most preferably 160° F.). The mixture is applied to a substrate simply by flooding the latter so as to cause the mixture to flow into the interstices of the substrate. Upon hardening, a completely effective water seal is provided.

In another method (which is less advantageous from a cost standpoint), an initial mixture is prepared which includes about 50% by weight water and about 50% by weight of the copolymer (the Amsco-Res products described above are admirably suited for use in this initial mixture). The mixture is then heated to the temperature specified above, and is then flooded over the substrate. Upon hardening of this initial mixture, a wear coating is applied over the surface of the substrate. Such a wear coating comprises a paving aggregate such as fly ash or crushed rock admixed with the asphaltic material of the invention. The wear coat is applied by first depositing the aggregate over the concrete surface, followed by saturating the aggregate with full strength, ambient temperature asphaltic material of the type described above. A firm bond is thus established between the initial mixture and the asphaltic material because of the presence of the vinyl acrylic copolymer in the mixture and material.

An alternative wear coating can also be used to good effect in connection with the method described immediately above. The wear coating is preferably comprised of a solid and a liquid phase, in a ratio of two parts liquid to one part solid. The liquid phase consists of 25% by weight acrylic copolymer, and 75% by weight water; the solid phase consists of 25% by weight Portland cement and 75% by weight sharp sand.

In use, the solid and liquid phases are admixed together at ambient temperatures to create a slurry, and the slurry is flooded over the upper surface of the initially treated substrate. This creates a durable wear surface.

Having thus described the invention, what is claimed as a new and desired to be secured by Letters Patent is:

1. An asphalt material for use with concrete or the like, comprising:
   from about 50 to 95% by weight of an aqueous asphaltic emulsion; and
   respective quantities of a vinyl acetate-acrylic copolymer and a latex having chloroprene as the primary monomer therein and having a solids content of from 40 to 60%, said respective quantities together totaling from about 5 to 50% by weight of the material,
   said copolymer and latex serving to give the asphalt material a degree of resiliency for sealing purposes.

2. The material as set forth in claim 1 wherein said emulsion is a cationic emulsion.

3. The material as set forth in claim 1 wherein said emulsion includes about 65% by weight asphaltic solids, an aqueous phase, and at least one surfactant.

4. The material as set forth in claim 1 wherein said emulsion is present at a level of about 90% by weight.

5. The material as set forth in claim 1 wherein said copolymer is present in an amount in excess of said latex.

6. The material as set forth in claim 1 wherein said copolymer has a solids content of from about 50 to 60% by weight.

7. The material as set forth in claim 1 wherein said latex is a carboxylated polymer having a standard solids content of from about 40 to 50% by weight.

8. The material as set forth in claim 1 wherein said respective quantities together total about 10% by weight, said copolymer being present at a level of about 7% by weight, and said latex being present at a level of about 3% by weight.

* * * * *